(12) United States Patent
Brill et al.

(10) Patent No.: US 11,542,918 B2
(45) Date of Patent: Jan. 3, 2023

(54) METHOD OF CONTROLLING A BLADE PITCH ANGLE OF A WIND TURBINE BY USE OF A HYDRAULIC SYSTEM

(71) Applicant: Siemens Gamesa Renewable Energy A/S, Brande (DK)

(72) Inventors: Anthony Brill, Boulder, CO (US); Mikkel Aggersbjerg Kristensen, Herning (DK)

(73) Assignee: SIEMENS GAMESA RENEWABLE ENERGY A/S

(*) Notice: Subject to any disclaimer, the term of this patent is extended or adjusted under 35 U.S.C. 154(b) by 71 days.

(21) Appl. No.: 17/165,997

(22) Filed: Feb. 3, 2021

(65) Prior Publication Data
US 2021/0262436 A1 Aug. 26, 2021

(30) Foreign Application Priority Data
Feb. 21, 2020 (EP) .................................... 20158763

(51) Int. Cl.
*F03D 7/02* (2006.01)
*F15B 1/027* (2006.01)
*F15B 15/02* (2006.01)

(52) U.S. Cl.
CPC ............ *F03D 7/0224* (2013.01); *F15B 1/027* (2013.01); *F15B 15/02* (2013.01); *F05B 2260/70* (2013.01); *F05B 2270/328* (2013.01)

(58) Field of Classification Search
CPC ................ F03D 7/0224; F05B 2260/70; F05B 2270/3298
See application file for complete search history.

(56) References Cited

U.S. PATENT DOCUMENTS

| 7,677,154 B2* | 3/2010 | Schmidt ................ F03D 7/0224 91/274 |
| 7,709,972 B2* | 5/2010 | Arinaga ................ F03D 7/0224 290/55 |
| 9,239,064 B2 | 1/2016 | Helbig et al. |

FOREIGN PATENT DOCUMENTS

| EP | 2990664 A1 | 3/2016 |
| WO | WO 2013097851 A1 | 7/2013 |
| WO | WO 2013113317 A1 | 8/2013 |

OTHER PUBLICATIONS

European Search Report dated Sep. 4, 2020 for application No. 20158763.1.

* cited by examiner

*Primary Examiner* — Michael L Sehn
(74) *Attorney, Agent, or Firm* — Schmeiser, Olsen & Watts LLP

(57) ABSTRACT

Provided is a method of controlling a pitch angle of at least one blade of a wind turbine by use of a hydraulic system, the hydraulic system including at least one reservoir configured to store a hydraulic fluid, and at least one pump configured to supply the hydraulic fluid from the reservoir to at least one accumulator, if a hydraulic fluid pressure in the accumulator falls below a lower threshold value and till the hydraulic fluid pressure in the accumulator exceeds an upper threshold value. The accumulator is configured to store the pressurized hydraulic fluid supplied by the pump and to supply the pressurized hydraulic fluid to at least one pitch control cylinder of the hydraulic system via at least one output valve of the hydraulic system. The pressurized hydraulic fluid in the pitch control cylinder drives at least one piston to change the pitch angle of the blade.

11 Claims, 3 Drawing Sheets

METHOD OF CONTROLLING A BLADE PITCH ANGLE OF A WIND TURBINE BY USE OF A HYDRAULIC SYSTEM

CROSS-REFERENCE TO RELATED APPLICATIONS

This application claims priority to European Application No. 20158763.1, having a filing date of Feb. 21, 2020, the entire contents of which are hereby incorporated by reference.

FIELD OF TECHNOLOGY

The following relates to a method of controlling a pitch angle of at least one blade of a wind turbine by use of a hydraulic system, and to a hydraulic system.

BACKGROUND

In a pressure-controlled hydraulic system such as a pitch control system of a wind turbine, where pitch actuators of the blades are hydraulically driven, the pressure of a hydraulic fluid in one or more hydraulic accumulators is maintained between upper and lower thresholds. As a hydraulic fluid is consumed for the movement of the pitch actuators, pressure in the accumulator(s) drops until reaching the lower threshold, at which point one or more pumps are caused to provide an inflow of the hydraulic fluid to the accumulator(s). The inflow is sustained until the upper threshold is reached.

In situations that incur a large consumption of the hydraulic fluid from the accumulators due to high flow rates or long travel distances of the pitch actuators, the hydraulic fluid pressure in the accumulators may continue to drop despite the inflow of oil so that a safe mode is eventually triggered with limited functionality. In the pitch control system of the wind turbine, this issue could result in a wind turbine shut down.

The required inflow can be secured by increasing the displacement of the pump(s), if these are of a variable-displacement type. If the pump(s) are of a fixed-displacement type, additional pump(s) of a pump array can be started.

Typically, fixed-displacement pumps require their output pressure to be relieved when starting up, either through open-center valves or by the use of a separate valve allowing the output flow from the pump to be returned directly to reservoir with a minimum of pressure.

The pump flow is typically controlled exclusively by the upper and lower thresholds for the accumulator pressure.

SUMMARY

An aspect relates to a method of controlling a pitch angle of at least one blade of a wind turbine by use of a hydraulic system, where a risk of triggering the safe mode can be reduced while keeping the wind turbine in operation in the above-mentioned situations so that the produced amount of electricity can be increased.

According to a first aspect of embodiments of the invention, a method of controlling a pitch angle of at least one blade of a wind turbine by use of a hydraulic system is provided. The hydraulic system comprises at least one reservoir configured to store a hydraulic fluid such as oil, at least one pump configured to supply the hydraulic fluid from the reservoir to at least one accumulator if a hydraulic fluid pressure in the accumulator falls below a lower threshold value and till the hydraulic fluid pressure in the accumulator exceeds an upper threshold value. The accumulator is configured to store the pressurized hydraulic fluid supplied by the pump and to supply the pressurized hydraulic fluid to at least one pitch control cylinder of the hydraulic system via at least one output valve of the hydraulic system. The pressurized hydraulic fluid in the pitch control cylinder drives at least one piston to change the pitch angle of the blade.

The method comprises steps of determining a target outflow of the pressurized hydraulic fluid from the accumulator to the pitch control cylinder; determining a difference between the determined target outflow of the pressurized hydraulic fluid from the accumulator to the pitch control cylinder and a predetermined inflow of the hydraulic fluid from the reservoir to the accumulator; and supplying the hydraulic fluid from the reservoir to the accumulator by the pump regardless whether or not the hydraulic fluid pressure in the accumulator is fallen below the lower threshold value, if the determined target outflow is larger than the predetermined inflow.

By embodiments of the present invention, the risk of triggering the safe mode is reduced so that the operation of the wind turbine can be continued. The produced amount of electricity can therefore be increased. In addition, the accumulator does not need to be scaled-up to satisfy a worst-case scenario in order to supply the requested hydraulic fluid pressure without triggering a safe mode so that embodiments of the present invention can reduce the costs of the accumulator.

In an embodiment, the target outflow of the pressurized hydraulic fluid from the accumulator to the pitch control cylinder is determined by at least one of a target pitch speed of the at least one blade, a target speed of the at least one piston, and a rate of change in the pressurized hydraulic fluid stored in the accumulator. The target pitch speed of the at least one blade can be a speed by which the blade is pitched.

In an embodiment, the controlling the pitch angle is implemented by an open-loop control.

In an embodiment, the pump is a variable-displacement type pump, wherein a displacement of the pump is increased if the difference between the determined target outflow of the pressurized hydraulic fluid from the accumulator to the pitch control cylinder and the predetermined inflow of the hydraulic fluid from the reservoir to the accumulator increases.

In an embodiment, the hydraulic system comprises a plurality of the pumps, each pump being a fixed-displacement type pump, wherein a number of the pumps, which supply the hydraulic fluid from the at least one reservoir to the at least one accumulator, is incremented if the difference between the determined target outflow of the pressurized hydraulic fluid from the at least one accumulator to the at least one pitch control cylinder and the predetermined inflow of the hydraulic fluid from the at least one reservoir to the at least one accumulator increases.

According to a second aspect of embodiments of the invention, a hydraulic system for controlling a pitch angle of at least one blade of a wind turbine is provided. The hydraulic system comprises at least one reservoir configured to store a hydraulic fluid, and at least one pump configured to supply the hydraulic fluid from the reservoir to at least one accumulator if a hydraulic fluid pressure in the accumulator falls below a lower threshold value and till the hydraulic fluid pressure in the accumulator exceeds an upper threshold value. The accumulator is configured to store the pressurized hydraulic fluid supplied by the pump and to supply the pressurized hydraulic fluid to at least one pitch control cylinder of the hydraulic system via at least one output valve of the hydraulic system. The pressurized hydraulic fluid in the pitch control cylinder drives at least one piston to change the pitch angle of the blade. The hydraulic system further comprises a control device which is configured to determine a target outflow of the pressurized hydraulic fluid from the accumulator to the pitch control cylinder, to determine a difference between the determined target outflow of the pressurized hydraulic fluid from the accumulator to the pitch control cylinder and a predetermined inflow of the hydraulic fluid from the reservoir to the accumulator, and to cause the pump to supply the hydraulic fluid from the reservoir to the accumulator regardless whether or not the hydraulic fluid pressure in the accumulator is fallen below the lower threshold value, if the determined target outflow is larger than the predetermined inflow.

In an embodiment, the control device determines the target outflow of the pressurized hydraulic fluid from the accumulator to the pitch control cylinder by at least one of a target pitch speed of the at least one blade, a target speed of the at least one piston, and a rate of change in the pressurized hydraulic fluid stored in the accumulator.

In an embodiment, the control device is configured to control the pitch angle by an open-loop control.

In an embodiment, the pump is a variable-displacement type pump, wherein the control device is configured to increase the displacement of the pump if the difference between the determined target outflow of the pressurized hydraulic fluid from the accumulator to the pitch control cylinder and the predetermined inflow of the hydraulic fluid from the reservoir to the accumulator increases.

In an embodiment, the hydraulic system comprising a plurality of the pumps, wherein each pump is a fixed-displacement type pump. The control device is configured to increment a number of the pumps, which supply the hydraulic fluid from the at least one reservoir to the at least one accumulator, if the difference between the determined target outflow of the pressurized hydraulic fluid from the at least one accumulator to the at least one pitch control cylinder and the predetermined inflow of the hydraulic fluid from the at least one reservoir to the at least one accumulator increases.

According to a third aspect of embodiments of the invention, a wind turbine is provided, which comprises a tower, a nacelle mounted at the tower, a hub rotatably mounted at the nacelle, at least one blade mounted at the hub, and the hydraulic system.

The above-mentioned embodiments include at least one blade, one reservoir, one pump, one accumulator, one pitch control cylinder, one output valve and one piston. However, it is clear for a person skilled in the art that embodiments of the present invention can also be embodied by implementing a plurality of blades (in particular three blades), a plurality of reservoirs, a plurality (an array) of pumps, a plurality of accumulators, a plurality of pitch control cylinders, a plurality of output valves and/or a plurality of pistons.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless otherwise notified, in addition to any combination of features belonging to one type of subject matter also any combination between features relating to different subject matters, in particular between features of the apparatus type claims and features of the method type claims is considered as to be disclosed with this application.

BRIEF DESCRIPTION

Some of the embodiments will be described in detail, with references to the following Figures, wherein like designations denote like members, wherein.

DETAILED DESCRIPTION

Figure 1:
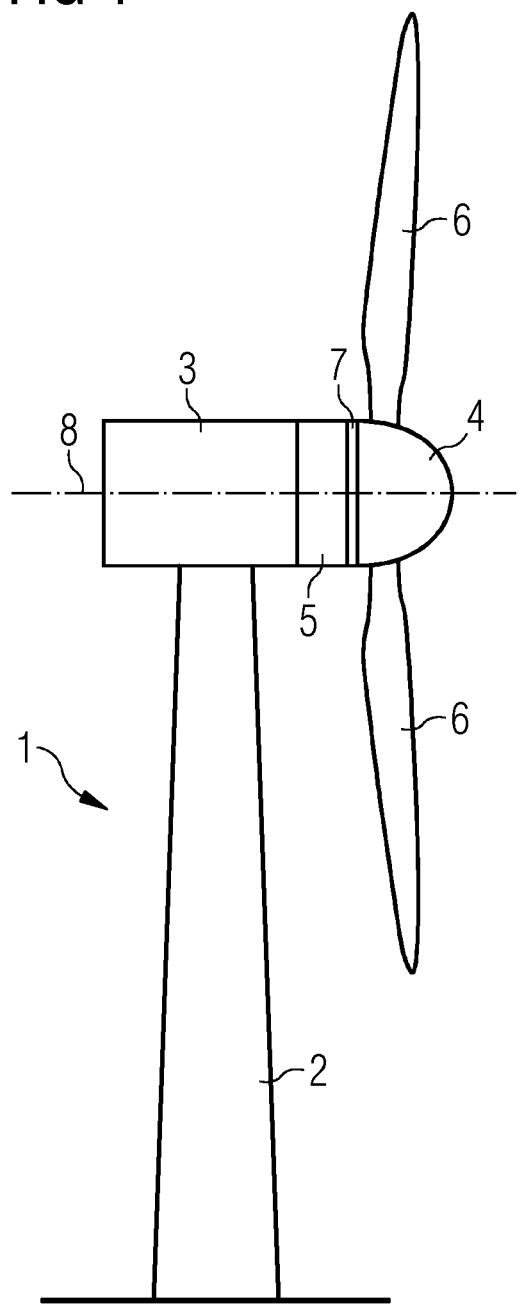
FIG. 1 shows a wind turbine and the different elements thereof.

The illustrations in the drawings are schematically. It is noted that in different figures, similar or identical elements are provided with the same reference signs.

FIG. 1 shows a wind turbine 1. The wind turbine 1 comprises a nacelle 3 and a tower 2. The nacelle 3 is mounted at the top of the tower 2. The nacelle 3 is mounted rotatable with regard to the tower 2 by a yaw bearing. The axis of rotation of the nacelle 3 with regard to the tower 2 is referred to as the yaw axis.

The wind turbine 1 also comprises a hub 4 with three rotor blades 6 (of which two rotor blades 6 are depicted in FIG. 1). Each blade 6 can be rotated about a longitudinal axis of the blade 6 by a so-called pitch angle. The pitch angle of the blade 6 is controlled by a pitch control.

The hub 4 is mounted rotatable with regard to the nacelle 3 by a main bearing 7. The hub 4 is mounted rotatable about a rotor axis of rotation 8.

The wind turbine 1 furthermore comprises a generator 5. The generator 5 in turn comprises a rotor connecting the generator 5 with the hub 4. The hub 4 is connected directly to the generator 5, thus the wind turbine 1 is referred to as a gearless, direct-driven wind turbine. Such a generator 5 is referred as direct drive generator 5. As an alternative, the hub 4 may also be connected to the generator 5 via a gear box. This type of wind turbine 1 is referred to as a geared wind turbine. Embodiments of the present invention are suitable for both types of wind turbines 1.

The generator 5 is accommodated within the nacelle 3. The generator 5 is arranged and prepared for converting the rotational energy from the hub 4 into electrical energy in the shape of an AC power.

Figure 2:
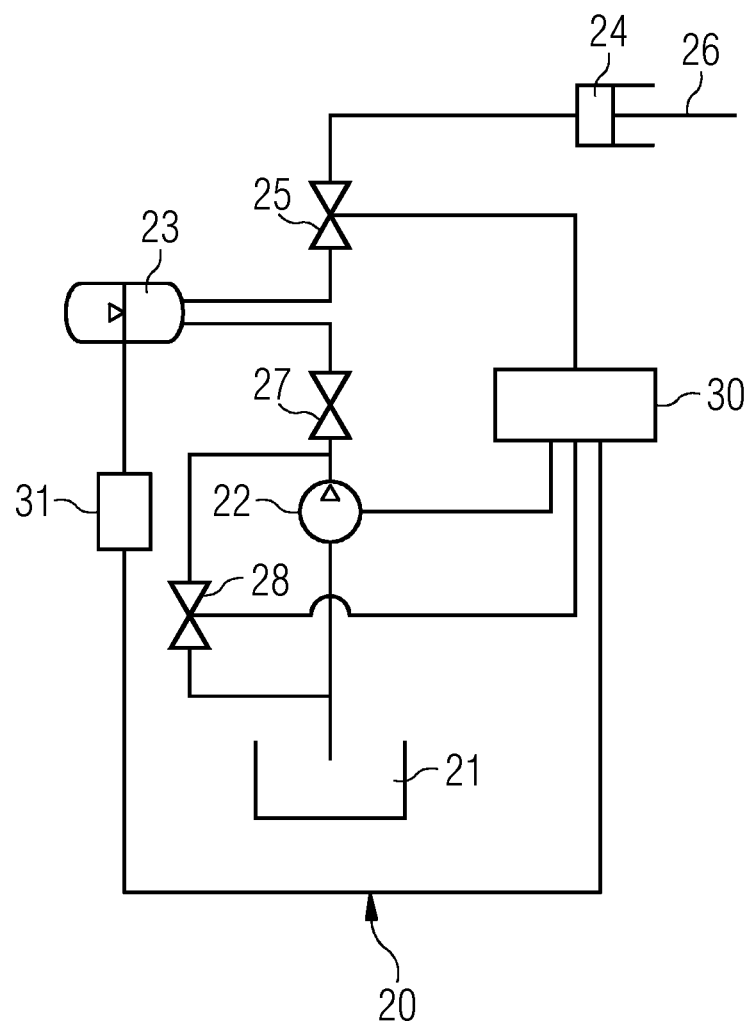
FIG. 2 shows a schematic view of main components of a hydraulic system according to an embodiment.

FIG. 2 shows a schematic view of main components of a hydraulic system 20 according to an embodiment. The hydraulic system 20 comprises a reservoir 21 configured to store a hydraulic fluid, for example oil, and a hydraulic pump 22 configured to supply the hydraulic fluid from the reservoir 21 to a hydraulic accumulator 23. Reference sign 27 designates an input valve, for example a check valve, which is arranged between the pump 22 and the accumulator 23. Reference sign 28 designates a bypass valve. When the bypass valve 28 is open and the pump 22 is operated while the input valve 27 is closed, the hydraulic fluid from the pump 22 returns to the reservoir 21. A plurality of pumps 22 can be used, which can share a common bypass valve 28.

The accumulator 23 is configured to store the pressurized hydraulic fluid supplied by the pump 22 and to supply the pressurized hydraulic fluid to a pitch control cylinder 24 of the hydraulic system 20 via an output valve 25 of the hydraulic system 20. The pressurized hydraulic fluid in the pitch control cylinder 24 drives a piston 26 to change the pitch angle of the blade 6. The mechanical link between the piston 26 and the blade 6 is well-known from the conventional art by the person skilled in the art and does not need to be described in further detail.

The hydraulic system 20 further comprises a control device 30 which is communicatively connected to a pressure sensor 31. The pressure sensor 31 detects the hydraulic fluid pressure in the accumulator 23. The hydraulic system 20 is also communicatively connected to the pump 22, the output valve 25 and the bypass valve 28, wherein the hydraulic system 20 is configured to send a first activation signal to the pump 22 for activating the pump 22, a second activation signal to the output valve 25 for opening the output valve 25 and third activation signal to the bypass valve 28 for opening the bypass valve 28. For example, the first activation signal is generally sent to the pump 22 in order to supply the hydraulic fluid from the reservoir 21 to the hydraulic accumulator 23. The pump 22 can continuously be operated. The second activation signal is sent to the output valve 25 in order to open the same so that the pitch control cylinder 24 is driven by the pressurized hydraulic fluid from the accumulator 23. The third activation signal is not sent to the bypass valve 28 to keep the bypass valve 28 closed so that the hydraulic fluid can be supplied from the reservoir 21 via the pump 22 and the check valve 27 to the accumulator 23. If the third activation signal is sent to the bypass valve 28, the same is opened so that the hydraulic fluid can return from the pump 22 to the reservoir 21.

Figure 3:
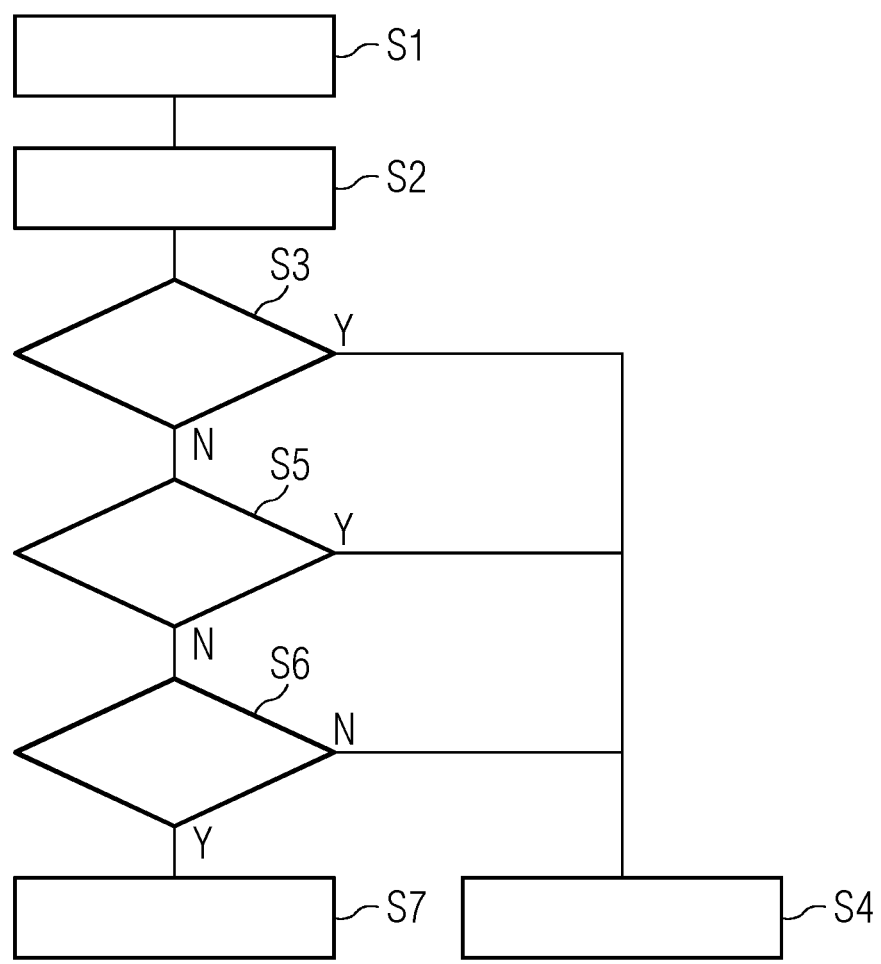
FIG. 3 shows a flow chart of an embodiment of controlling a pitch angle of a blade of a wind turbine by use of a hydraulic system.

FIG. 3 shows a flow chart of an embodiment of controlling the pitch angle of the blade 6 of the wind turbine by use of the hydraulic system 20. The following steps of the control are usually carried out by the control device 30.

In a step S1, a target outflow of the pressurized hydraulic fluid from the accumulator 23 to the pitch control cylinder 24 is determined. For example, the target outflow of the pressurized hydraulic fluid from the accumulator 23 to the pitch control cylinder 24 can be determined by at least one of a target pitch speed of the blade 6, a target speed of the piston 26, and a rate of change in the pressurized hydraulic fluid stored in the accumulator 23. The target pitch speed of the blade 6 can be a speed by which the blade 6 is pitched. The target pitch speed of the blade 6, the target speed of the piston 26, and the rate of change in the pressurized hydraulic fluid stored in the accumulator 23 characterize the target (i.e. requested) outflow of the pressurized hydraulic fluid from the accumulator 23 to the pitch control cylinder 24. The present embodiment implements an open-loop control (feedforward control) of controlling the pitch angle by determining the target outflow of the pressurized hydraulic fluid from the accumulator 23 to the pitch control cylinder 24 as described above. The actual outflow is not directly detected because the present embodiment does not implement a closed-loop control (feedback-control) of the pitch angle. By implementing the open-loop control, the control method is very fast and simple.

In a step S2, a difference between the determined target outflow of the pressurized hydraulic fluid from the accumulator 23 to the pitch control cylinder 24 and a predetermined inflow of the hydraulic fluid from the reservoir 21 to the accumulator 23 is determined. For example, the predetermined inflow of the hydraulic fluid from the reservoir 21 to the accumulator 23 can be a nominal displacement (100%) of the pump 22. Alternatively, the predetermined inflow of the hydraulic fluid from the reservoir 21 to the accumulator 23 can be set to a predetermined percentage (smaller than 100%) of the nominal displacement of the pump 22, or the predetermined inflow of the hydraulic fluid from the reservoir 21 to the accumulator 23 can be a currently available displacement of the pump 22.

In a step S3, it is checked whether or not the difference between the determined target outflow of the pressurized hydraulic fluid from the accumulator 23 to the pitch control cylinder 24 and the predetermined inflow of the hydraulic fluid from the reservoir 21 to the accumulator 23 is larger than zero. In this case, the determined target outflow of the pressurized hydraulic fluid from the accumulator 23 to the pitch control cylinder 24 exceeds the predetermined inflow of the hydraulic fluid from the reservoir 21 to the accumulator 23.

If the result in step S3 is affirmative (Yes), the method proceeds to a step S4, where the hydraulic fluid is still supplied from the reservoir 21 to the accumulator 23 by the pump 22. If the result in step S3 is negative (No), the method proceeds to a step S5, where it is checked whether or not the hydraulic fluid pressure in the accumulator 23 is fallen below the lower threshold value.

If the result in step S5 is affirmative (Yes), the method proceeds to the step S4, where the hydraulic fluid is still supplied from the reservoir 21 to the accumulator 23 by the pump 22. If the result in step S5 is negative (No), the method proceeds to a step S6, where it is checked whether or not the hydraulic fluid pressure in the accumulator 23 has exceeded the upper threshold value.

If the result in step S6 is negative (No), the method proceeds to the step S4, where the hydraulic fluid is still supplied from the reservoir 21 to the accumulator 23 by the pump 22. If the result in step S6 is affirmative (Yes), the method proceeds to a step S7, where the supply of the hydraulic fluid from the reservoir 21 to the accumulator 23 is stopped. This is realized by opening the bypass valve 28 so that the hydraulic fluid from the pump 22 directly returns to the reservoir 21. Alternatively, the pump 22 can just be stopped.

After steps S4 and S7, the method jumps back to step S1 and is iteratively repeated.

In one embodiment, the pump 22 is a variable-displacement type pump 22. A displacement of the pump 22 is increased in step S4 if the difference between the determined target outflow of the pressurized hydraulic fluid from the accumulator 23 to the pitch control cylinder 24 and the predetermined inflow of the hydraulic fluid from the reservoir 21 to the accumulator 23 increases. The displacement can continuously be ramped by the variable-displacement pump 22.

In another embodiment, the hydraulic system 20 comprising a plurality of pumps 22, wherein each pump 22 is a fixed-displacement type pump. The term "fixed-displacement" means that the pump 22 can have a fixed nominal displacement. A number of the pumps 22, which supply the hydraulic fluid from the at least one reservoir 21 to the at least one accumulator 23, is incremented in step S4 if the difference between the determined target outflow of the pressurized hydraulic fluid from the at least one accumulator 23 to the at least one pitch control cylinder 24 and the predetermined inflow of the hydraulic fluid from the at least one reservoir 21 to the at least one accumulator 23 increases. The number of the pumps 22, which supply the hydraulic fluid from the at least one reservoir 21 to the at least one accumulator 23, can be incremented by closing respective bypass valves 28 which are assigned to different pumps 22.

Alternatively, it is possible to supply the hydraulic fluid from the reservoir 21 to the at least one accumulator 23 just by switching the pump 22 on/off.

The depicted embodiments include only one blade 6, one reservoir 21, one pump 22, one accumulator 23, one pitch control cylinder 24, one output valve 25 and one piston 26. However, it is clear for a person skilled in the art that embodiments of the present invention can also be embodied by implementing a plurality of blades 6 (in particular three blades 6), a plurality of reservoirs 21, a plurality of pumps 22, a plurality of accumulators 23, a plurality of pitch control cylinders 24, a plurality of output valves 25, a plurality of bypass valves 28 and/or a plurality of pistons 26.

In the embodiments, the output valve 25 and the bypass valve 28 are described as normally closed valves, which are closed when the activation signals are not applied. However, embodiments of the present invention can also be implemented by normally open valves, which are open when the activation signals are not applied.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A method of controlling a pitch angle of at least one blade of a wind turbine by use of a hydraulic system, the hydraulic system including at least one reservoir configured to store a hydraulic fluid, and at least one pump configured to supply the hydraulic fluid from the at least one reservoir to at least one accumulator, if a hydraulic fluid pressure in the at least one accumulator falls below a lower threshold value and till the hydraulic fluid pressure in the at least one accumulator exceeds an upper threshold value, wherein the at least one accumulator is configured to store the pressurized hydraulic fluid supplied by the at least one pump and to supply the pressurized hydraulic fluid to at least one pitch control cylinder of the hydraulic system via at least one output valve of the hydraulic system, the pressurized hydraulic fluid in the at least one pitch control cylinder drives at least one piston to change the pitch angle of the at least one blade, the method comprising:
determining a target outflow of the pressurized hydraulic fluid from the at least one accumulator to the at least one pitch control cylinder;
determining a difference between the determined target outflow of the pressurized hydraulic fluid from the at least one accumulator to the at least one pitch control cylinder and a predetermined inflow of the hydraulic fluid from the at least one reservoir to the at least one accumulator; and
supplying the hydraulic fluid from the at least one reservoir to the at least one accumulator by the at least one pump regardless whether or not the hydraulic fluid pressure in the at least one accumulator is fallen below the lower threshold value, if the determined target outflow is larger than the predetermined inflow.

2. The method according to claim 1, wherein the target outflow of the pressurized hydraulic fluid from the at least one accumulator to the at least one pitch control cylinder is determined by at least one of a target pitch speed of the at least one blade, a target speed of the at least one piston, and a rate of change in the pressurized hydraulic fluid stored in the at least one accumulator.

3. The method according to claim 1, wherein the controlling of the pitch angle is implemented by an open-loop control.

4. The method according to claim 1, wherein the at least one pump is a variable-displacement type pump, wherein a displacement of the at least one pump is increased if the difference between the determined target outflow of the pressurized hydraulic fluid from the at least one accumulator to the at least one pitch control cylinder and the predetermined inflow of the hydraulic fluid from the at least one reservoir to the at least one accumulator increases.

5. The method according to claim 1, wherein the at least one pump is part of a plurality of pumps, wherein each pump of the plurality of pumps is a fixed-displacement type pump, wherein a number of pumps of the plurality of pumps, which supply the hydraulic fluid from the at least one reservoir to the at least one accumulator, is incremented if the difference between the determined target outflow of the pressurized hydraulic fluid from the at least one accumulator to the at least one pitch control cylinder and the predetermined inflow of the hydraulic fluid from the at least one reservoir to the at least one accumulator increases.

6. A hydraulic system for controlling a pitch angle of at least one blade of a wind turbine, the hydraulic system comprising:
at least one reservoir configured to store a hydraulic fluid;
at least one pump configured to supply the hydraulic fluid from the at least one reservoir to at least one accumulator, if a hydraulic fluid pressure in the at least one accumulator falls below a lower threshold value and till the hydraulic fluid pressure in the at least one accumulator exceeds an upper threshold value;
the at least one accumulator being configured to store the pressurized hydraulic fluid supplied by the at least one pump and to supply the pressurized hydraulic fluid to at least one pitch control cylinder of the hydraulic system via at least one output valve of the hydraulic system, wherein the pressurized hydraulic fluid in the at least one pitch control cylinder drives a at least one piston to change the pitch angle of the at least one blade; and
a control device configured to determine a target outflow of the pressurized hydraulic fluid from the at least one accumulator to the at least one pitch control cylinder, to determine a difference between the determined target outflow of the pressurized hydraulic fluid from the at least one accumulator to the at least one pitch control cylinder and a predetermined inflow of the hydraulic fluid from the at least one reservoir to the at least one accumulator, and to cause the at least one pump to supply the hydraulic fluid from the at least one reservoir to the at least one accumulator regardless whether or not the hydraulic fluid pressure in the at least one accumulator is fallen below the lower threshold value, if the determined target outflow is larger than the predetermined inflow.

7. The hydraulic system according to claim 6, wherein the control device determines the target outflow of the pressurized hydraulic fluid from the at least one accumulator to the at least one pitch control cylinder by at least one of a target pitch speed of the at least one blade, a target speed of the at least one piston, and a rate of change in the pressurized hydraulic fluid stored in the at least one accumulator.

8. The hydraulic system according to claim 6, wherein the control device is configured to control the pitch angle by an open-loop control.

9. The hydraulic system according to claim 6, wherein the at least one pump is a variable-displacement type pump, wherein the control device is configured to increase the displacement of the at least one pump if the difference between the determined target outflow of the pressurized hydraulic fluid from the at least one accumulator to the at least one pitch control cylinder and the predetermined inflow of the hydraulic fluid from the at least one reservoir to the at least one accumulator increases.

10. The hydraulic system according to claim 6, wherein the at least one pump is part of a plurality of pumps, wherein each pump of the plurality of pumps is a fixed-displacement type pump, wherein the control device is configured to increment a number of pumps of the plurality of pumps, which supply the hydraulic fluid from the at least one reservoir to the at least one accumulator, if the difference between the determined target outflow of the pressurized hydraulic fluid from the at least one accumulator to the at least one pitch control cylinder and the predetermined inflow of the hydraulic fluid from the at least one reservoir to the at least one accumulator increases.

11. A wind turbine comprising a tower, a nacelle mounted at the tower, a hub rotatably mounted at the nacelle, the at least one blade mounted at the hub, and the hydraulic system according to claim 6.

\* \* \* \* \*